United States Patent
Post et al.

(10) Patent No.: US 11,038,386 B2
(45) Date of Patent: Jun. 15, 2021

(54) AXIAL FLUX ELECTRIC MACHINE AND METHODS OF ASSEMBLING THE SAME

(71) Applicant: Regal Beloit America, Inc., Beloit, WI (US)

(72) Inventors: Steven W. Post, Centerton, AR (US); Lyn D. Coones, Cassville, MO (US); Jeff J. Long, Purdy, MO (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 85 days.

(21) Appl. No.: 16/435,041

(22) Filed: Jun. 7, 2019

(65) Prior Publication Data

US 2020/0067357 A1   Feb. 27, 2020

Related U.S. Application Data

(63) Continuation-in-part of application No. 16/112,327, filed on Aug. 24, 2018, now Pat. No. 10,916,976.

(51) Int. Cl.
| | |
|---|---|
| *H02K 1/14* | (2006.01) |
| *H02K 1/18* | (2006.01) |
| *H02K 3/32* | (2006.01) |
| *H02K 21/24* | (2006.01) |
| *H02K 15/02* | (2006.01) |

(Continued)

(52) U.S. Cl.
CPC .......... *H02K 1/148* (2013.01); *H02K 1/182* (2013.01); *H02K 3/325* (2013.01); *H02K 7/085* (2013.01); *H02K 15/022* (2013.01); *H02K 15/105* (2013.01); *H02K 21/24* (2013.01); *H02K 2203/12* (2013.01)

(58) Field of Classification Search
CPC ............ H02K 1/14; H02K 1/148; H02K 1/18; H02K 1/182; H02K 1/2793; H02K 3/325; H02K 15/022; H02K 15/10; H02K 21/24; H02K 2203/12
USPC .......................... 310/51, 198, 208, 218, 268
See application file for complete search history.

(56) References Cited

U.S. PATENT DOCUMENTS

| | | | |
|---|---|---|---|
| 6,844,651 B1 * | 1/2005 | Swift | H02K 3/48 |
| | | | 310/214 |
| 7,592,733 B2 | 9/2009 | Naitou et al. | |
| 9,935,525 B2 | 4/2018 | Koiwai et al. | |

(Continued)

FOREIGN PATENT DOCUMENTS

| | | |
|---|---|---|
| CN | 103855900 A | 6/2014 |
| CN | 103956841 A | 7/2014 |

(Continued)

OTHER PUBLICATIONS

EP Extended Search Report for application 19193013.0 dated Jan. 22, 2020; 8 pp.

(Continued)

*Primary Examiner* — Tulsidas C Patel
*Assistant Examiner* — Rashad H Johnson
(74) *Attorney, Agent, or Firm* — Armstrong Teasdale LLP

(57) ABSTRACT

A stator assembly for use in an axial flux electric motor includes a plurality of circumferentially-spaced tooth assemblies that each includes a tooth portion and a base portion. The stator assembly also includes a plurality of circumferentially-spaced bridge members that are each configured to engage a pair of circumferentially adjacent base portions.

17 Claims, 9 Drawing Sheets

(51) Int. Cl.
*H02K 15/10* (2006.01)
*H02K 7/08* (2006.01)

(56) References Cited

U.S. PATENT DOCUMENTS

| | | |
|---|---|---|
| 2005/0017596 A1* | 1/2005 | Naito .................... H02K 1/148 310/268 |
| 2006/0103263 A1 | 5/2006 | Naito et al. |
| 2008/0061649 A1 | 3/2008 | Kim et al. |
| 2011/0037335 A1 | 2/2011 | Jang et al. |
| 2011/0221297 A1 | 9/2011 | Langfordr et al. |
| 2011/0316381 A1 | 12/2011 | Asano et al. |
| 2014/0132106 A1 | 5/2014 | Horst et al. |
| 2014/0265653 A1 | 9/2014 | Heins et al. |
| 2017/0302144 A1 | 10/2017 | Boaventura-Delanoe |
| 2018/0205280 A1 | 7/2018 | Henry et al. |
| 2018/0323663 A1 | 11/2018 | Ogawa et al. |
| 2019/0006901 A1* | 1/2019 | Henry .................... H02K 1/182 |
| 2019/0356194 A1* | 11/2019 | Post ........................ H02K 1/148 |

FOREIGN PATENT DOCUMENTS

| | | |
|---|---|---|
| CN | 103997145 A | 8/2018 |
| DE | 102016203140 A1 | 8/2017 |
| EP | 2224577 A1 | 9/2010 |
| EP | 2453557 A2 | 5/2012 |
| JP | 2009011086 A | 1/2009 |

OTHER PUBLICATIONS

EPO Office Action for EP Application 19193013.0 dated Jan. 29, 2021; 9 pp.

* cited by examiner

AXIAL FLUX ELECTRIC MACHINE AND METHODS OF ASSEMBLING THE SAME

CROSS-REFERENCE TO RELATED APPLICATIONS

This application is a continuation-in-part of U.S. patent application Ser. No. 16/112,327 filed Aug. 24, 2018, the contents of each of which are hereby incorporated by reference in their entirety.

BACKGROUND OF THE INVENTION

The field of the invention relates generally to electrical machines, and more particularly, to axial flux electric motors having a modular stator.

One of many applications for an electric motor is to operate a pump or a blower. The electric motor may be configured to rotate an impeller within a pump or blower, which displaces a fluid, causing a fluid flow. Many gas burning appliances include an electric motor, for example, water heaters, boilers, pool heaters, space heaters, furnaces, and radiant heaters. In some examples, the electric motor powers a blower that moves air or a fuel/air mixture through the appliance. In other examples, the electric motor powers a blower that distributes air output from the appliance.

In some known axial flux electric motors, partial stator teeth with attached tooth tips are attached to U-shaped stator members and the stator core, bobbins, and windings are over-molded with a resin to secure the stator components together. However, over-molding the stator increases the motor manufacturing and labor costs and also limits the power produced by the motor because of heat built up within the over-molded stator.

Another known axial flux electric motor includes a press-together lamination system where a pair of stator teeth are pressed into a single stator base. However, such a configuration limits the motor type to a multiple of 10 pole motor.

BRIEF DESCRIPTION OF THE INVENTION

In one aspect, a stator assembly for use in an axial flux electric motor is provided. The stator assembly includes a plurality of circumferentially-spaced tooth assemblies that each includes a tooth portion and a base portion. The stator assembly also includes a plurality of circumferentially-spaced bridge members that are each configured to engage a pair of circumferentially adjacent base portions.

In another aspect, an axial flux electric motor is provided. The axial flux electric motor includes a frame, a rotor assembly, and a stator assembly coupled to the frame and positioned proximate the rotor assembly to define an axial gap therebetween. The stator assembly includes a plurality of circumferentially-spaced tooth assemblies that each includes a tooth portion and a base portion. The stator assembly also includes a plurality of circumferentially-spaced bridge members that are each configured to engage a pair of circumferentially adjacent base portions.

In yet another aspect, a method of assembling an axial flux electric motor is provided. The method includes coupling a plurality of circumferentially-spaced tooth assemblies to a frame. Each tooth assembly includes a base portion coupled to the frame and a tooth portion extending axially from the base portion. The method also includes coupling a bridge member to a pair of circumferentially adjacent base portions such that the bridge member extends between the circumferentially adjacent base portion.

DETAILED DESCRIPTION OF THE INVENTION

Described herein are exemplary methods and systems for axial flux electric motors. The axial flux motor includes a stator assembly having a plurality of circumferentially-spaced tooth assemblies that each include a tooth portion and a base portion integrally formed with the base portion. The stator assembly also includes a plurality of circumferentially-spaced bridge members that are each configured to engage a pair of circumferentially adjacent base portions. A bridge member is coupled between circumferentially adjacent base portions to both apply an axial pre-load force to the base portions and also to facilitate the flow of flux between adjacent base portions. The laminations that make up the bridge member are oriented such that the flux direction does not create eddy currents but yet allows the lamination direction to create a structural member to hold the stator components in place. The mechanical joints between the base portions and the bridge member hold the stator assembly together without the need to over-mold the stator assembly with resin, thus reducing the cost and increasing the efficiency of the motor. The resulting configuration allows for a customized motor size and also for relatively small motors for use in high speed applications.

Figure 1:
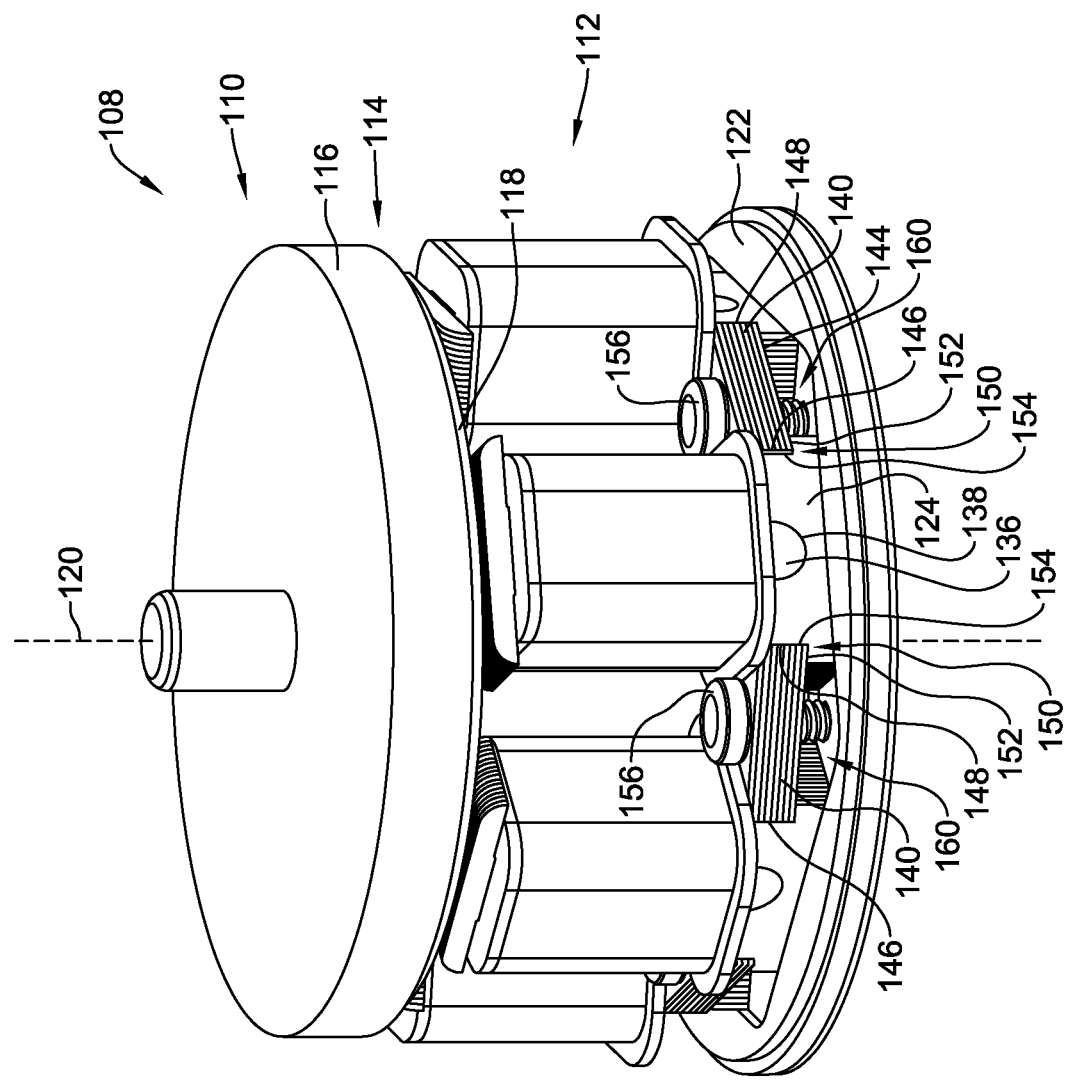
FIG. 1 is a perspective view of an embodiment of a motor.
Figure 2:
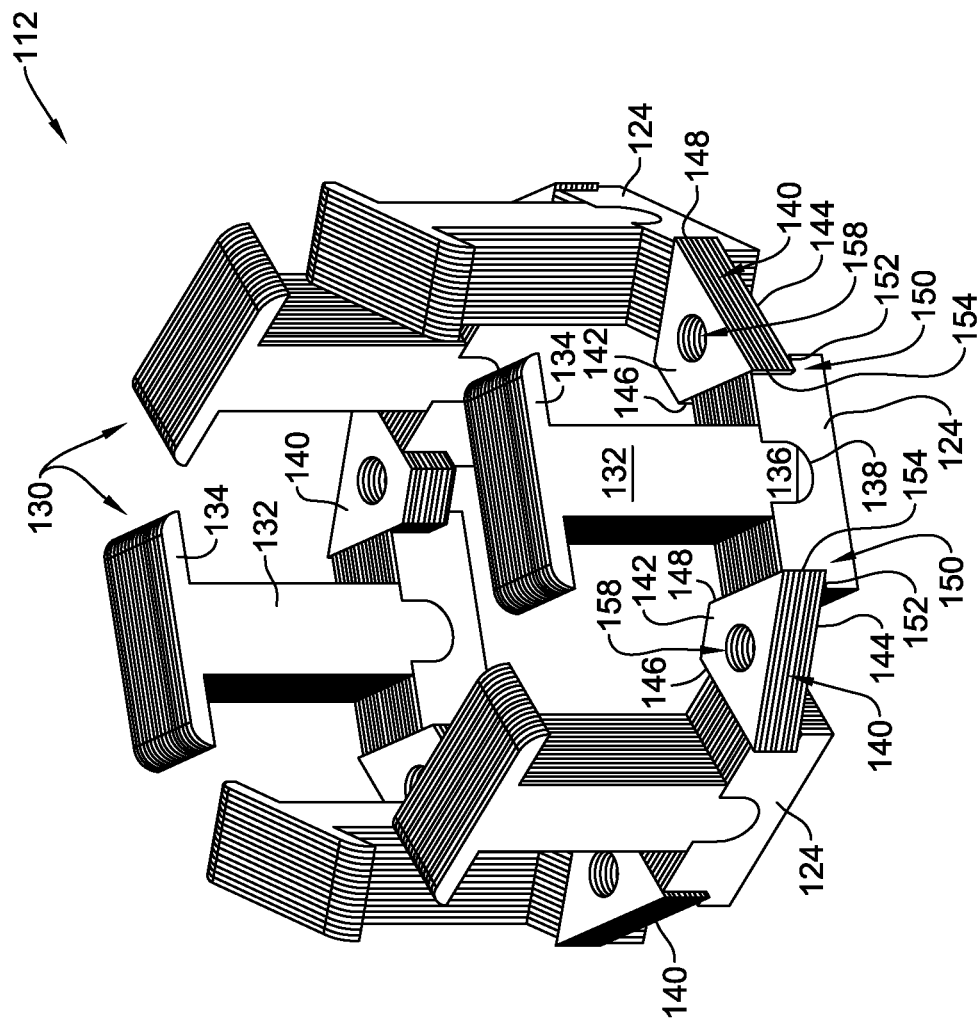
FIG. 2 is a perspective view of a stator assembly for use with the motor shown in FIG. 1.

FIG. 1 is a perspective view of a motor 108. FIG. 2 is a perspective view of a stator assembly 112 for use with motor 108. In one embodiment, motor 108 is an axial flux electric motor including a rotor assembly 110 and a stator assembly 112 coupled to rotor assembly 110 to define an axial gap 114 therebetween. Rotor assembly 110 generally includes a rotor 116 and at least one permanent magnet 118 coupled to rotor 116. In one embodiment, permanent magnet 118 is fabricated from ferrite and is formed as single disc having a plurality of poles. Alternatively, permanent magnet 118 includes a plurality of magnet segments coupled to rotor 116. Generally, any suitable permanent magnet shape, segment count, and material may be used that enables motor 108 to function as described herein. Rotor assembly 110 is rotatable within motor casing 106 about an axis of rotation 120. In one embodiment, motor 108 is energized by an electronic control (not shown), for example, a sinusoidal or trapezoidal output electronic control. In one embodiment, rotor 116 is machined and/or cast from any suitable material, for example, steel.

Stator assembly 112 is a multi-phase (more than one phase) axial flux stator, and is preferably a three-phase axial flux stator producing flux in the axial direction (i.e., parallel to axis of rotation 120). Stator assembly 112 includes a motor frame 122 coupled to blower housing 102 and at least one base portion 424 coupled to motor frame 122. In one embodiment, stator assembly 112 includes a plurality of circumferentially-spaced base portions 124 coupled to motor frame 122. Stator assembly 112 also includes a plurality of tooth assemblies 130 that each include a stator tooth 132 coupled to a tooth tip 134. Alternatively, tooth assemblies 130 may include only stator tooth 132 and not tooth tip 134.

As described in further detail below, in one embodiment, each base portion 424 is coupled to at least one tooth assembly 130. As used herein, the term "coupled" is meant to describe both a mechanical joining of separate components and also to describe configurations where the components are integrally formed as a unitary member. For example, in one embodiment, base portions 124 and tooth assemblies 130 are formed separately and coupled together by inserting at least one tooth assembly 130 into each base portion 424, as described below. In another embodiment, base portions 124 and tooth assemblies 130 are coupled together by integrally forming each base portion 424 with at least one tooth assembly 130 from a single lamination. In both configurations, each base portion 424 is "coupled" to at least one tooth assembly 130 either by a positive mechanical joint or by integral forming.

In one embodiment, each stator tooth 132 includes an insertable portion 136 and each base portion 424 includes at least one receiving slot 138 configured to receive insertable portion 136 to form a mechanical joint between base portion 424 and stator tooth 132. As used herein, the term "mechanical joint" is meant to describe a portion of a machine where one mechanical part is connected to another. Specifically, a mechanical joint is formed by joining metal parts through a positive-holding mechanical assembly. More specifically, in one embodiment, mechanical joint 139 is an interference fit between base portion 424 and stator tooth 132 where the external dimension of one part slightly exceeds the internal dimension of the part into which it has to fit. As such, insertable portion 136 and receiving slot 138 hold tooth assembly 130 and base portion 424 together without the need to over-mold stator assembly 112 with resin, thus reducing the cost and increasing the efficiency of motor 108.

In one embodiment, each base portion 424 includes a single receiving slot 138 and a relief slot (not shown). Furthermore, base portion 424 includes a post (not shown) positioned between the relief slot and receiving slot 138. In operation, as insertable portion 136 of stator tooth 132 is inserted into receiving slot 138, the post will slightly deform to account for a taper angle of insertable portion 136, which will result in a similar deformation of the relief slot. As such, the retention forces on both sides of insertable portion 136 are equal and tooth assembly 130 maintains an orientation perpendicular to base portion 424 and parallel to axis 120.

Figure 3:
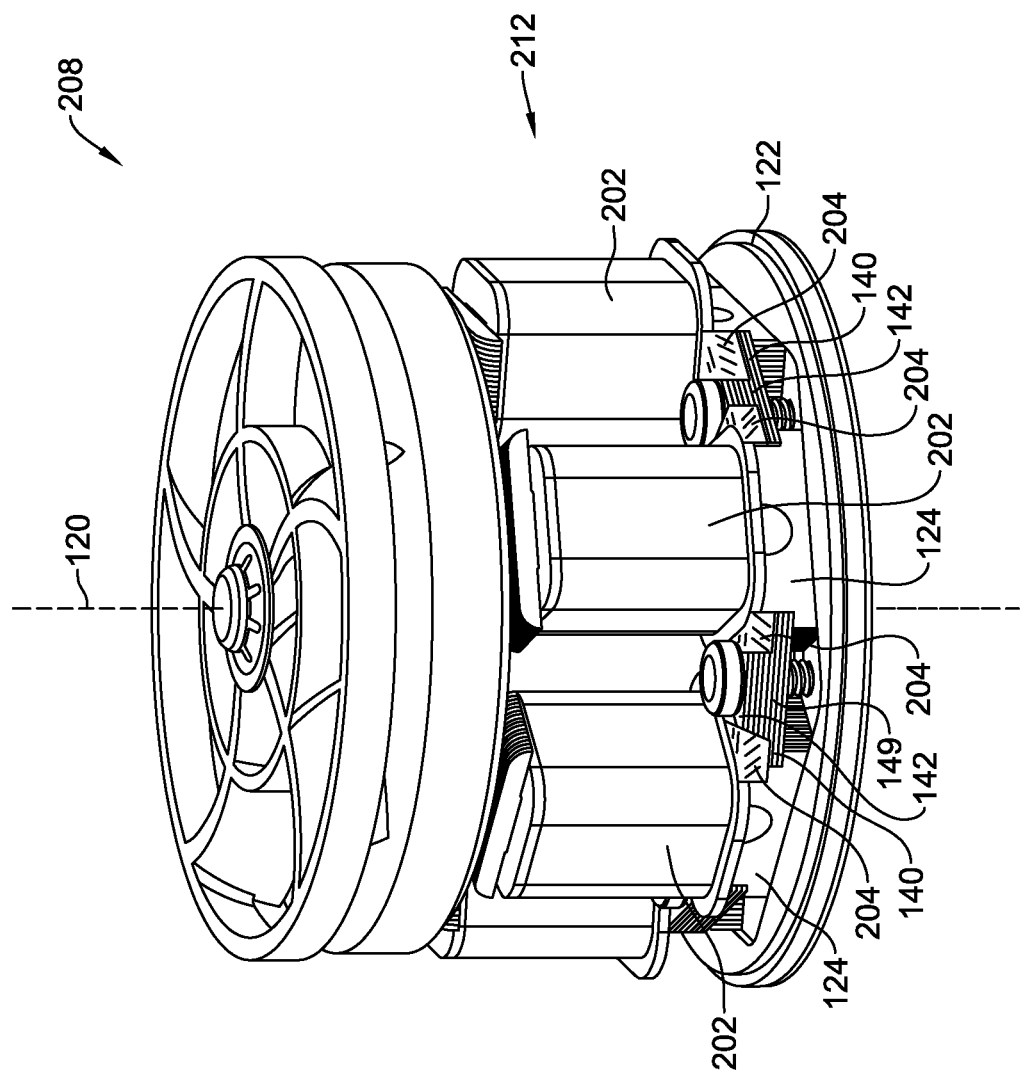
FIG. 3 is a perspective view of another embodiment of a motor illustrating an alternative stator assembly.

As shown in FIGS. 2 and 3, in one embodiment, tooth tip 134 and stator tooth 132 are integrally formed as a unitary component. Alternatively, tooth tip 134 and stator tooth 132 are separate components coupled together. In another embodiment, tooth assemblies 130 include only stator teeth 132 and not tooth tips 134. In one embodiment, tooth assembly 130, having tooth tip 134 and stator tooth 132, is fabricated from a plurality of stacked laminated sheets. Such a construction simplifies the manufacturing process and enables tooth assembly 130 to be produced quickly and efficiently. Stator tooth 132 has the substantially same width from an inner edge to an outer edge. This enables the laminated sheets that make tooth assembly 130 to be substantially identical, which lowers manufacturing costs. Similarly, base portion 424 is also formed from a plurality of stacked laminated sheets. More specifically, each laminated sheet of tooth assembly 130 and base portion 424 includes a pair of lamination interlocks that facilitate coupling multiple laminated sheets together to form tooth assembly 130 or base portion 424 having a desired width. The lamination interlocks are formed as a dimple on one side of tooth assembly 130 and base portion 424 and as a projection on the opposing side. As such, the projection of one interlock of a first sheet fits into the dimple of another interlock on an adjacent sheet.

In one embodiment, stator assembly 112 also includes a plurality of circumferentially-spaced bridge members 140 that engage a pair of circumferentially adjacent base portions 124 to apply an axial pre-load force to base portions to retain base portions 124 in their desired positions and to create a flux path between adjacent base portions 124. As best shown in FIG. 2, bridge members 140 are substantially trapezoidal in shape and include a first axial surface 142, a second axial surface 144, a first circumferential end surface 146, and a second circumferential end surface 148. In one embodiment, each base portion 424 includes a pair of substantially similar end shoulders 150 that are each defined by an axial surface 152 and a circumferential end surface 154. In operation, a single bridge member 140 engages adjacent end shoulders 150 of circumferentially adjacent base portions 124. More specifically, second axial surface 144 of bridge members 140 engages shoulder axial surface 152 of both circumferentially adjacent end shoulders 150 to apply an axial force to axial surface 152. In some embodiments, first circumferential end surface 146 of each bridge member 140 engages the corresponding shoulder circumferential end surface 154 of a first base portion 424 and second circumferential end surface 148 of each bridge member 140 engages the corresponding shoulder circumferential end surface 154 of a second base portion 424 circumferentially adjacent to the first base portion 424.

In one embodiment, stator assembly 112 also includes a plurality of fasteners 156 that couple bridge members 140 to frame 122. More specifically, each bridge member 140 includes an opening 158 defined therethrough that receives a fastener 156. As best shown in FIG. 1, fasteners 156 extend through openings 158 and between bridge members 140 and frame 122 to secure base portions 124 to frame 122. As such, fasteners 156 exert an axial force on bridge members 140, which is transferred to base portions 124 through engagement of at least axial surfaces 144 and 152. In such a configuration, base portions 124 space bridge members 140 from frame 122 to define a gap 160 therebetween. In one embodiment, fasteners 156 are non-ferrous screws. In another embodiment, fasteners 156 are rivets or clamps. Generally, fasteners 156 are any type of retention device that facilitates operation of stator assembly 112 as described herein. As such, bridge members 140 apply an axial pre-load force to base portion 424 and holds stator assembly 112 together without the need to over-mold with resin, thus reducing the cost and increasing the efficiency of motor 108.

As best shown in FIGS. 1 and 2, bridge members 140 are formed from a plurality of stacked laminations similar to tooth assemblies 130 and base portions 124. However, while tooth assemblies 130 and base portions 124 are formed from vertically oriented laminations, as described above, bridge members 140 are formed from a plurality of horizontally oriented laminations. This difference in orientation between base portions 124 and bridge members 140 reduces the occurrence of eddy currents and enables the flux to flow efficiently between base portions 124 because the horizontal laminations of bridge members 140 are oriented in the same direction as the direction of flux flow leaving base portions 124. Additionally, in one embodiment, stator assembly 112 includes a very thin insulation layer (not shown), such as but not limited to, a sheet of material or an applied coating, between base portions 124 and bridge members 140 to prevent shorting of the laminations and to further reduce eddy current formation.

As described herein, in one embodiment, bridge members 140 both apply an axial pre-load force to base portions 124 and also create an efficient flux path that reduces eddy current formation. In one embodiment, bridge members 140 function to only apply the axial pre-load force and do not facilitate flux flow. In such a configuration, bridge members 140 may be formed from a material other than stacked laminations and function as a clamp to secure base portions 124 to frame 122. Alternatively, in another embodiment, bridge members 140 function to only facilitate efficient flux flow between adjacent base portions 124 and do not apply an axial pre-load force to base portions 124. In such a configuration, bridge members 140 may be formed of horizontally oriented laminations, as in one embodiment, but are coupled to base portions 124 using an adhesive.

FIG. 3 is a perspective view of an alternative embodiment of a motor 208 illustrating an alternative stator assembly 212. Stator assembly 212 is substantially similar to stator assembly 112 (shown in FIGS. 1 and 2) in operation and composition, with the exception that the bobbins 202 of stator assembly 212 include extension flanges 204 to retain bridge members 140 rather than fasteners 156. As such, like components shown in FIG. 3, such as base portion 424 and bridge members 140, are labeled with the same reference numbers used in FIGS. 1 and 2.

Stator assembly 212 includes a plurality of bobbins 202 coupled to base portion 424. Each bobbin 202 includes an opening that closely conforms to an external shape of stator tooth 132. As described herein, stator tooth 132 is configured to be inserted into a first end of the bobbin opening and to exit a second end of the opening before stator tooth 132 is coupled to receiving slot 138. Stator assembly 212 may include one bobbin 202 for every tooth 132 or one bobbin 202 positioned on every other tooth 132. Each bobbin 202 also includes an electrical winding (not shown) that includes a plurality of coils that are wound around a respective bobbin 202, which electrically isolates the coils of the winding from stator tooth 132 and tooth tip 134.

In the embodiment shown in FIG. 3, each bobbin 202 includes a pair of extension flanges 204 that extend from opposing circumferential ends of each bobbin 202 axially proximate base portions 124. Each extension flange 204 engages an adjacent bridge member 140 to hold bridge member 140 in position. More specifically, each extension flange 204 engages both first axial surface 142 and a radially outer surface 149 of its corresponding bridge member 140. In such a configuration, extension flanges 204 apply an axial down force on bridge members 140, in a similar manner as fasteners 156 do for the embodiment in FIGS. 1 and 3, to hold base portions 124 in place on frame 122. Additionally, extension flanges 204 engage the radially outer surface 149 of bridge members 140 to retain bridge members 140 in place in operation of motor 208.

Figure 4:
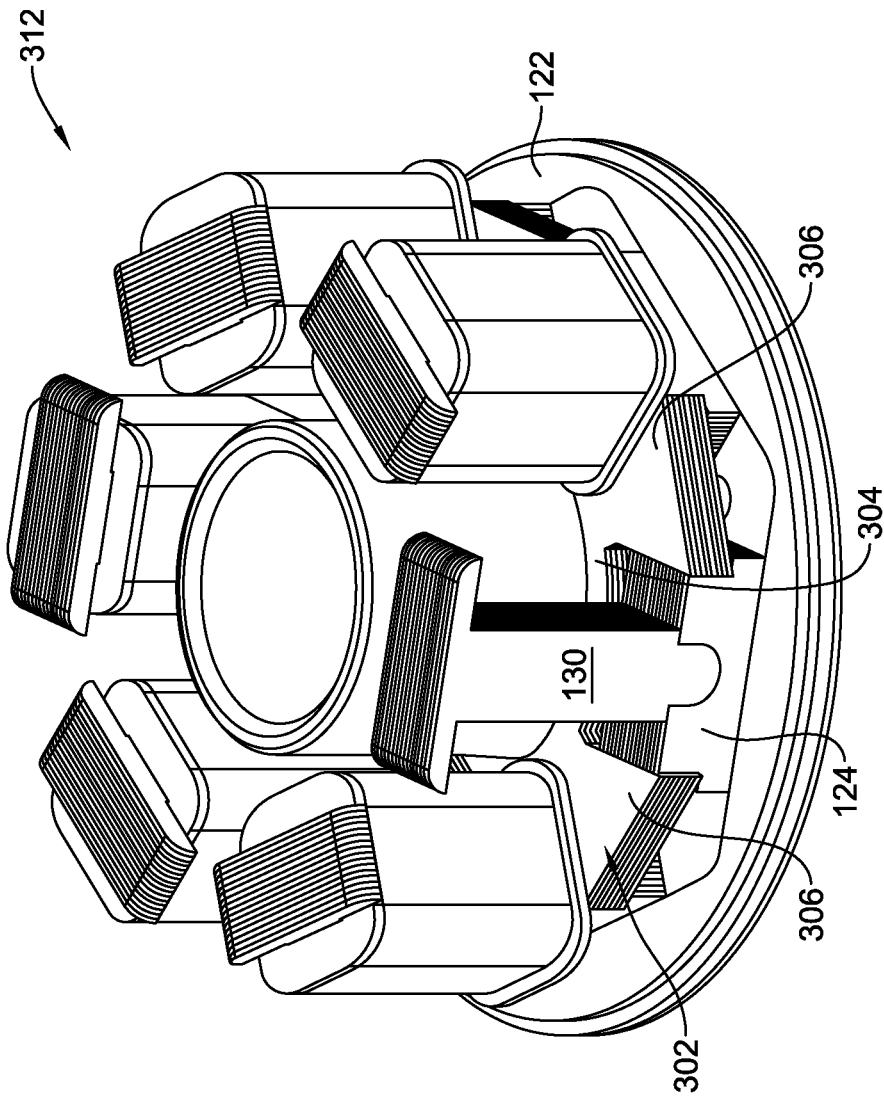
FIG. 4 is a perspective view of another embodiment of a stator assembly.
Figure 5:
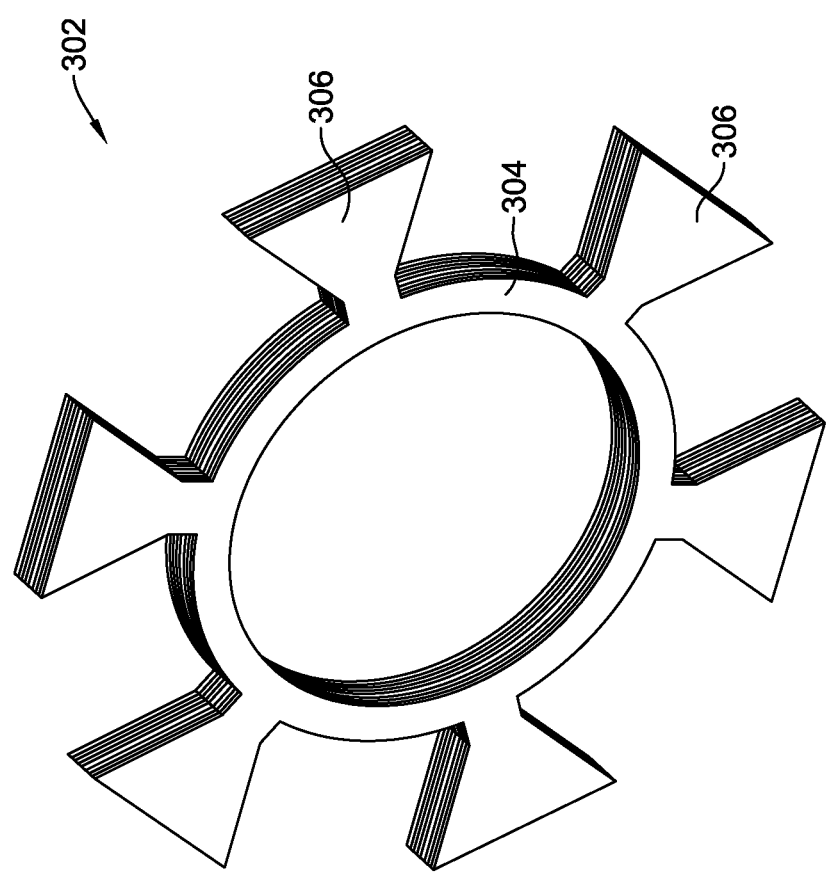
FIG. 5 is a perspective view of a bridge ring for use in the stator assembly shown in FIG. 4.

FIG. 4 is a perspective view of another alternative embodiment of a stator assembly 312. FIG. 5 is a perspective view of a bridge ring 302 for use in the stator assembly 312 shown in FIG. 4. Stator assembly 312 is substantially similar to stator assembly 112 (shown in FIGS. 1 and 2) in operation and composition, with the exception that stator assembly 312 includes a bridge ring 302 having a connecting ring 304 and a plurality of bridge members 306 rather than the individual plurality of bridge members 140 in stator assembly 112. As such, like components shown in FIG. 4, such as base portion 424 and tooth assemblies 130, are labeled with the same reference numbers used in FIGS. 1 and 3.

Bridge ring 302 includes connecting ring 304 integrally formed with the plurality of bridge members 306 to connect members 306 together. As shown in FIGS. 4 and 5, connecting ring 304 is positioned radially inward of bridge members 306. In an alternative embodiment, connecting ring 306 is positioned radially outward from bridge members 306. Bridge ring 302 may be used with fasteners 156 of stator assembly 112 or with bobbin extension flanges 204 of stator assembly 212 (when connecting ring 304 is radially inward of bridge members 306). Alternatively, bridge ring 302 may be used independent of fasteners 156 and extension flanges 204. Similar to bridge members 140, bridge ring 302 is formed from a plurality of horizontal laminations for the same reasons as described above. Bridge ring 302 allows for simpler installation of bridge members 306 into stator assembly 312 when manufacturing a large number of stator assemblies 312 with a known number of poles.

A method of assembling axial flux motor 108 is described herein. The method includes coupling at least one base portion 424 to motor frame 122, wherein base portion 424 includes receiving slot 138. The method also includes inserting a tooth assembly 130 at least partially into the receiving slot 138 of each base portion 424. The method also includes coupling bridge member 140 to a pair of circumferentially adjacent base portions 124 such that bridge member 140 extends between the circumferentially adjacent base portions 124 and applies an axial pre-load force to base portions 124.

Figure 6:
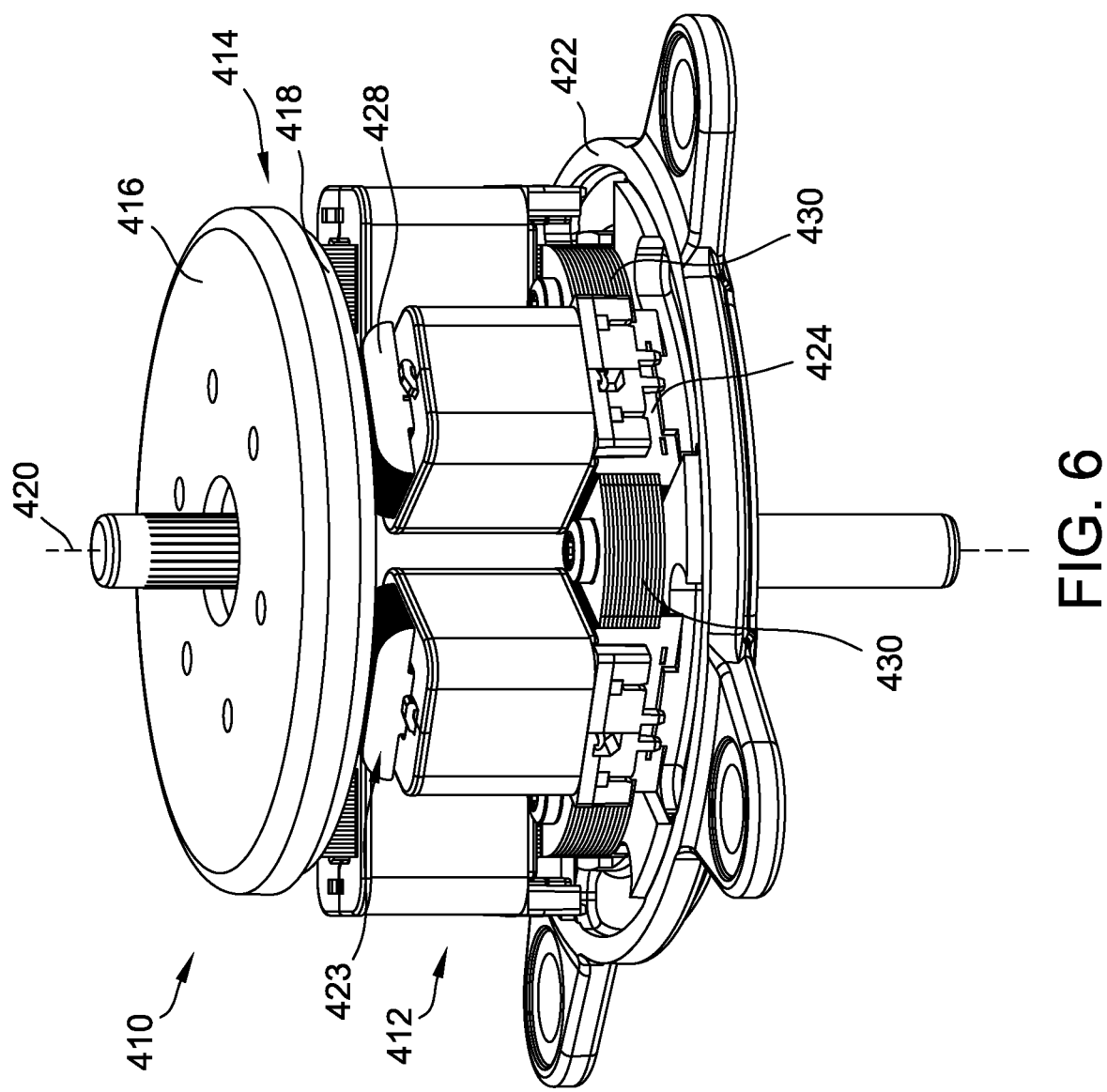
FIG. 6 is a perspective view of an exemplary embodiment of a motor.
Figure 7:
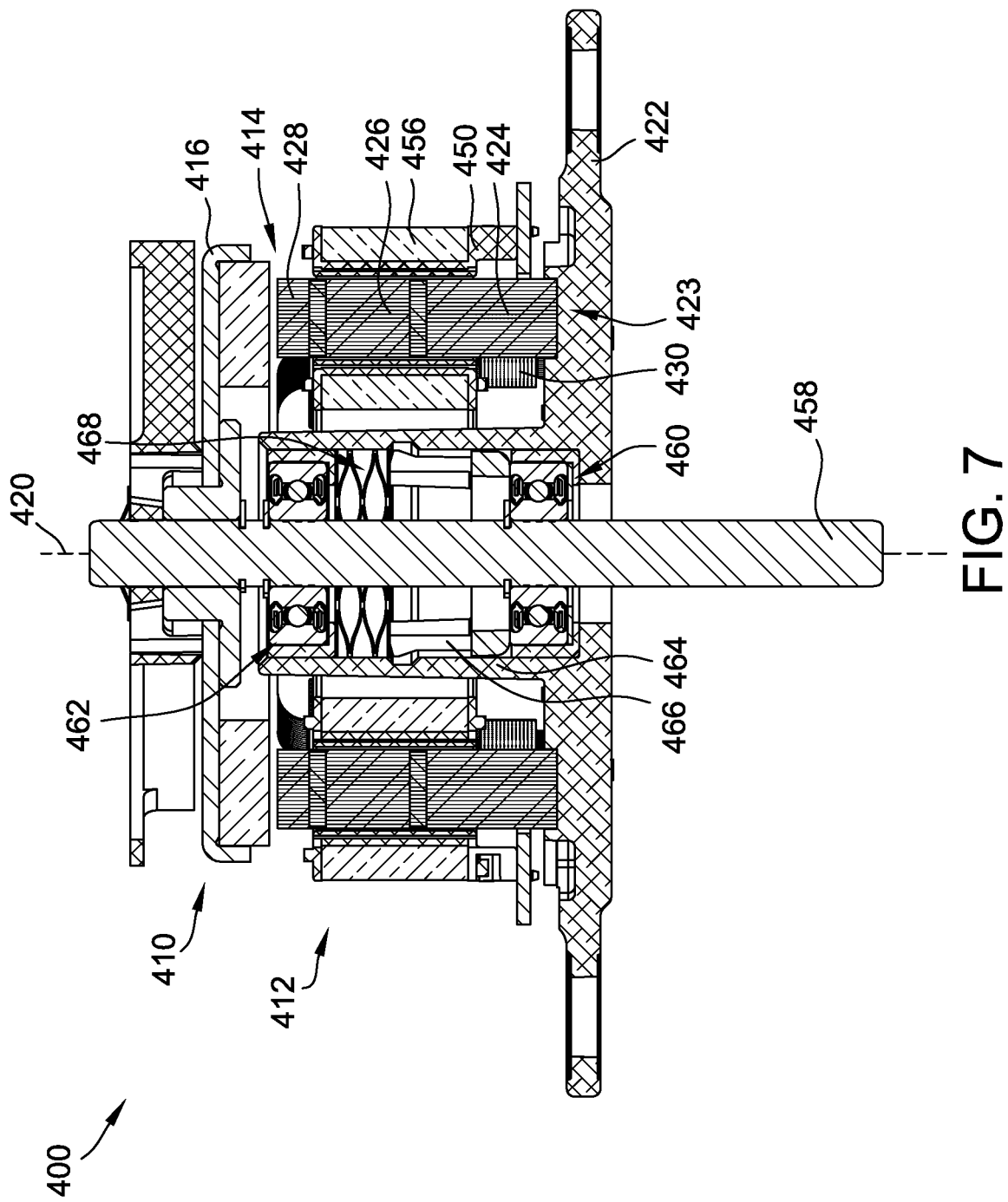
FIG. 7 is a cross-sectional view of the motor shown in FIG. 6.
Figure 8:
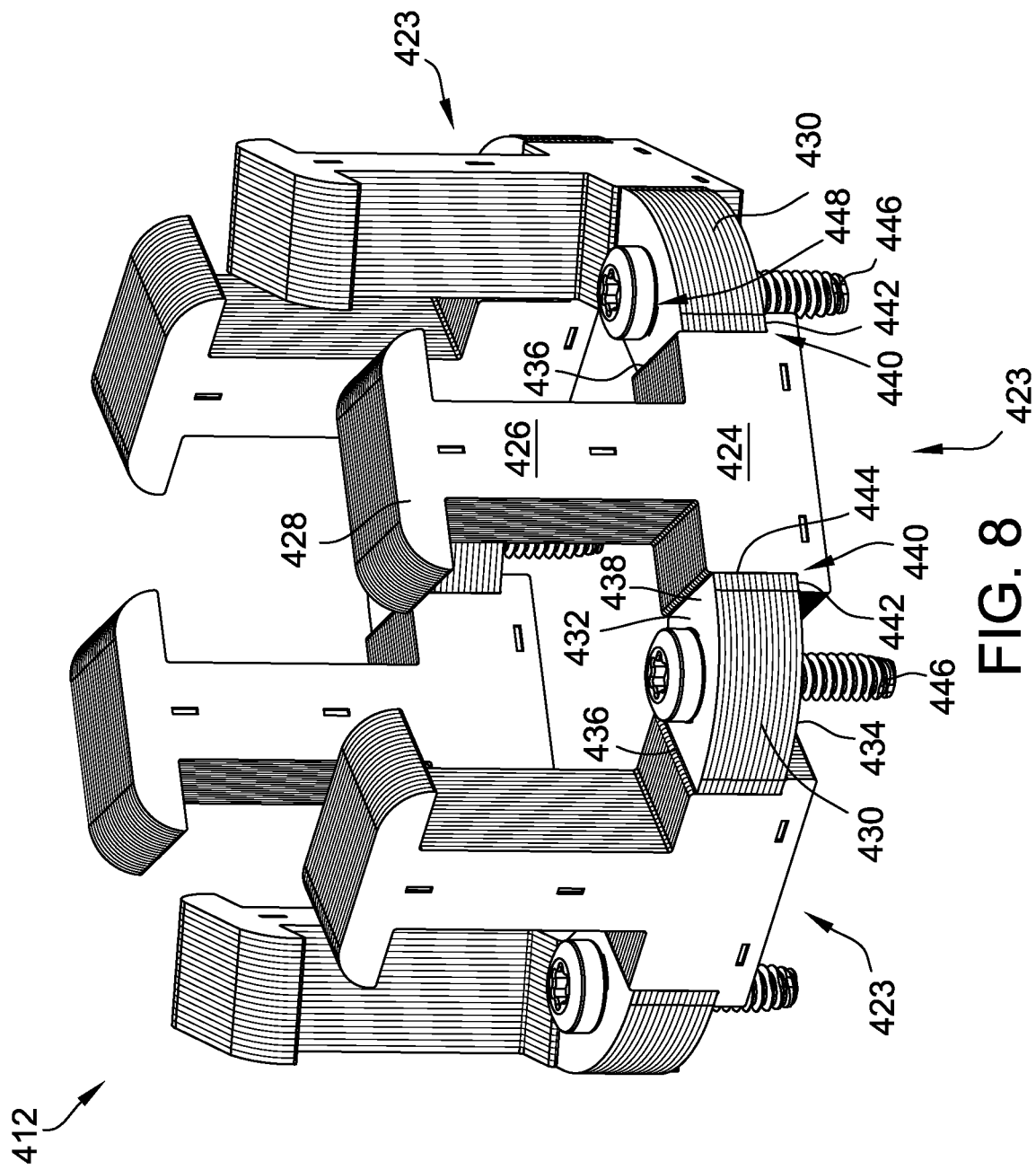
FIG. 8 is a perspective view of an exemplary stator assembly for use in the motor shown in FIG. 6.
Figure 9:
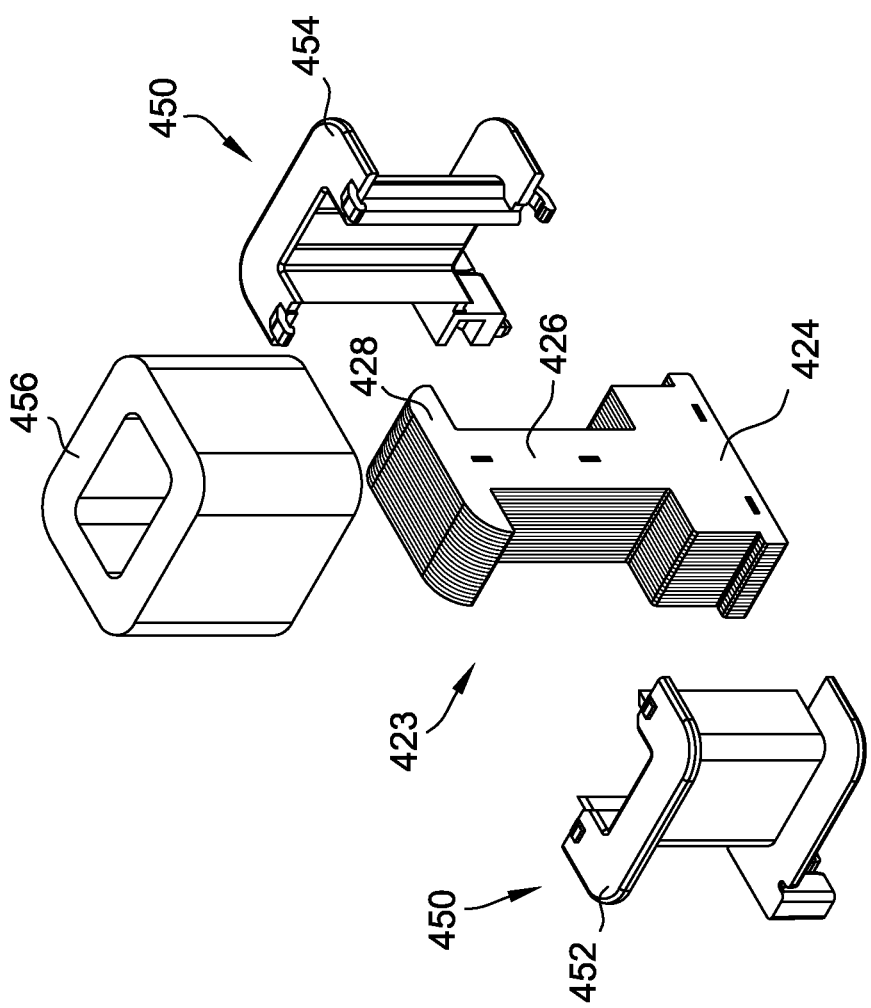
FIG. 9 is an exploded view of a portion of the stator assembly shown in FIG. 8.

FIG. 6 is a perspective view of a motor 400. FIG. 7 is a cross-sectional view of motor 400. FIG. 8 is a perspective view of a stator assembly 412 for use in motor 400 shown in FIG. 6. FIG. 9 is an exploded view of a portion of stator assembly 412 illustrating a bobbin. In the exemplary embodiment, motor 400 is an axial flux electric motor including a rotor assembly 410 and a stator assembly 412 coupled to rotor assembly 410 to define an axial gap 414 therebetween. Rotor assembly 410 generally includes a rotor 416 and at least one permanent magnet 418 coupled to rotor 416. In the exemplary embodiment, permanent magnet 418 is fabricated from ferrite and is formed as single disc having a plurality of poles. Alternatively, permanent magnet 418 includes a plurality of magnet segments coupled to rotor 416. Generally, any suitable permanent magnet shape, segment count, and material may be used that enables motor 400 to function as described herein. Rotor assembly 410 is rotatable about an axis of rotation 420. In the exemplary embodiment, motor 400 is energized by an electronic control (not shown), for example, a sinusoidal or trapezoidal output electronic control. In the exemplary embodiment, rotor 416 is machined and/or cast from any suitable material, for example, steel.

Stator assembly 412 is a multi-phase (more than one phase) axial flux stator, and is preferably a three-phase axial flux stator producing flux in the axial direction (i.e., parallel to axis of rotation 420). Stator assembly 412 includes a motor frame 422 coupled to a blower housing (not shown) and a plurality of circumferentially-spaced tooth assemblies 423 coupled to motor frame 422. In the exemplary embodiment, each tooth assembly 423 includes a base portion 424 coupled to motor frame 422. Tooth assemblies 423 also include a tooth portion 426 extending axially from base portion 424 and a tooth tip 428 coupled to an end of tooth portion 426 opposite base portion 424.

As best shown in FIGS. 8 and 9, each tooth assembly 423 is formed from a plurality of stacked laminations, and each lamination includes a tooth tip 428, a tooth portion 426, and a base portion 424. Specifically, each lamination includes a tooth portion 426 integrally formed with a base portion 424 as a single piece. More specifically, each lamination includes a tooth tip 428 integrally formed with tooth portion 426 and base portion 424 such that tooth tip 428, tooth portion 426, and base portion 424 of each lamination are formed from a single piece as a unitary component.

Forming tooth assemblies 423 from stacked laminations simplifies the manufacturing process and enables each tooth assembly 423 to be produced quickly and efficiently. Tooth portion 426 has the substantially same width from an inner edge to an outer edge. This enables the laminated sheets that make tooth assembly 423 to be substantially identical, which lowers manufacturing costs. Further, each laminated sheet of tooth assembly 423 includes a pair of lamination interlocks that facilitate coupling multiple laminated sheets together to form tooth assembly 423 having a desired width. The lamination interlocks are formed as a dimple on one side of tooth assembly 423 and as a projection on the opposing side. As such, the projection of one interlock of a first sheet fits into the dimple of another interlock on an adjacent sheet. Alternatively, the lamination interlocks have any form that facilitates operation of tooth assemblies 423 as described herein. In another embodiment, tooth assemblies 423 are formed from soft magnetic composite (SMC).

In the exemplary embodiment, stator assembly 412 also includes a plurality of circumferentially-spaced bridge members 430 that engage a pair of circumferentially adjacent base portions 424 to apply an axial pre-load force to base portions to retain base portions 424 in their desired positions and to create a flux path between adjacent base portions 424. As best shown in FIG. 8, bridge members 430 are substantially trapezoidal in shape and include a first axial surface 432, a second axial surface 434, a first circumferential end surface 436, and a second circumferential end surface 438. In the exemplary embodiment, each base portion 424 includes a pair of substantially similar end shoulders 440 that are each defined by an axial surface 442 and a circumferential end surface 444.

In operation, each bridge member 430 engages adjacent end shoulders 440 of circumferentially adjacent base portions 424. More specifically, second axial surface 434 of bridge members 430 engages shoulder axial surface 442 of both circumferentially adjacent end shoulders 440 to apply an axial force to axial surface 442. In some embodiments, first circumferential end surface 436 of each bridge member 430 engages the corresponding shoulder circumferential end surface 444 of a first base portion 424 and second circumferential end surface 438 of each bridge member 430 engages the corresponding shoulder circumferential end surface 444 of a second base portion 424 circumferentially adjacent to the first base portion 424.

In the exemplary embodiment, stator assembly 412 also includes a plurality of fasteners 446 that couple bridge members 430 to frame 422. More specifically, each bridge member 430 includes an opening 448 defined therethrough that receives a fastener 446. Fasteners 446 extend through openings 448 and between bridge members 430 and frame 422 to secure base portions 424 to frame 422. As such, fasteners 446 exert an axial force on bridge members 430, which is transferred to base portions 424 through engagement of at least axial surfaces 434 and 442. In such a configuration, base portions 424 space bridge members 430 from frame 422 to define a gap therebetween. In the exemplary embodiment, fasteners 446 are non-magnetic or low-magnetic screws. In another embodiment, fasteners 446 are rivets or clamps. Generally, fasteners 446 are any type of retention device that facilitates operation of stator assembly 412 as described herein. As such, bridge members 430 apply an axial pre-load force to base portion 424 and hold stator assembly 412 together without the need to over-mold with resin, thus reducing the cost and increasing the efficiency of motor 400.

As best shown in FIGS. 6 and 8, bridge members 430 are formed from a plurality of stacked laminations similar to tooth assemblies 423. In another embodiment, tooth assemblies 423 are formed from soft magnetic composite (SMC). However, while tooth assemblies 423 are formed from vertically oriented laminations, as described above, bridge members 430 are formed from a plurality of horizontally oriented laminations. This difference in orientation between base portions 424 and bridge members 430 reduces the occurrence of eddy currents and enables the flux to flow efficiently between base portions 424 because the horizontal laminations of bridge members 430 are oriented in the same direction as the direction of flux flow leaving base portions 424. Additionally, in one embodiment, stator assembly 412 includes a very thin insulation layer (not shown), such as but not limited to, a sheet of material or an applied coating, between base portions 424 and bridge members 430 to prevent shorting of the laminations and to further reduce eddy current formation.

As described herein, in the exemplary embodiment, bridge members 430 both apply an axial pre-load force to base portions 424 and also create an efficient flux path between adjacent tooth assemblies 423. In one embodiment, bridge members 430 function to only apply the axial pre-load force and do not facilitate flux flow. In such a configuration, bridge members 430 may be formed from a material other than stacked laminations and function as a clamp to secure base portions 424 to frame 422. Alternatively, in another embodiment, bridge members 430 function to only facilitate efficient flux flow between adjacent base portions 424 and do not apply an axial pre-load force to base portions 424. In such a configuration, bridge members 430 may be formed of horizontally oriented laminations, as in the exemplary embodiment, but are coupled to base portions 424 using an adhesive.

Referring back to FIGS. 7 and 9, stator assembly 412 also includes a plurality of bobbins 450, each coupled to a corresponding tooth portion 426. In the embodiment, bobbins 450 are of a split bobbin configuration and include a first bobbin portion 452 and a second bobbin portion 454. Since tooth assemblies 423 include tooth tips 428, a split bobbin configuration facilitates coupling first bobbin portion 452 to second bobbin portion 454 such that bobbin portions 452 and 454 surround tooth portion 426. Once bobbins 450 are coupled to tooth assemblies 423, a wire coil 456 is wound around bobbins 450.

Referring now to FIG. 7, motor 400 also includes a shaft 458 and a pair of bearing assemblies 460 and 462 coupled to shaft 458. Specifically, frame 422 includes a bearing locator 464 extending axially through stator assembly 412. As shown in FIG. 7, bearing assemblies 460 and 462 are positioned within bearing locator 464. A bearing spacer 466 is positioned within bearing locator 464 between the pair of bearing assemblies 460 and 462. Further, a bearing spring 468 is positioned within bearing locator 464 between pair of bearing assemblies 460 and 462, wherein bearing spacer 466 is positioned between bearing spring 468 and a bearing assembly 460 of the pair of bearing assemblies. Bearing spring 466 acts as a spacer to maintain a desired distance between bearing assemblies 460 and 462 while enabling the use of a shorter bearing spring 468, which reduces costs. The use of plastic bearing spacer 466 also reduces the noise generated by motor 400 by replacing a metal-on-metal engagement when a longer bearing spring than bearing spring 468 was used.

Described herein are exemplary methods and systems for axial flux electric motors. The axial flux motor includes a stator assembly having a plurality of circumferentially-spaced tooth assemblies that each include a tooth portion and a base portion integrally formed with the base portion. The stator assembly also includes a plurality of circumferentially-spaced bridge members that are each configured to engage a pair of circumferentially adjacent base portions. A bridge member is coupled between circumferentially adjacent base portions to both apply an axial pre-load force to the base portions and also to facilitate the flow of flux between adjacent base portions. The laminations that make up the bridge member are oriented such that the flux direction does not create eddy currents but yet allows the lamination direction to create a structural member to hold the stator components in place. The mechanical joints between the base portions and the bridge member hold the stator assembly together without the need to over-mold the stator assembly with resin, thus reducing the cost and increasing the efficiency of the motor. The resulting configuration allows for any customized motor size.

Exemplary embodiments of the axial flux electric machine assembly are described above in detail. The electric machine and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A stator assembly for use in an axial flux electric motor, said stator assembly comprising:
   a plurality of circumferentially-spaced tooth assemblies, wherein each tooth assembly comprises a tooth portion and a base portion;
   a plurality of circumferentially-spaced bridge members, wherein each bridge member is configured to engage a pair of circumferentially adjacent base portions; and
   a plurality of bobbins coupled to a corresponding tooth portion, wherein each bobbin comprises a split bobbin configuration having a first bobbin portion and a second bobbin portion.

2. The stator assembly in accordance with claim 1, further comprising a frame and a plurality of fasteners, wherein each bridge member includes an opening defined therethrough configured to receive a corresponding fastener of said plurality of fasteners, wherein said plurality of fasteners extend between said bridge members and said frame to apply an axial pre-load force to said base portions.

3. The stator assembly in accordance with claim 1, where each tooth portion comprises a tooth tip positioned opposite said base portion.

4. The stator assembly in accordance with claim 1, wherein said plurality of tooth assemblies are each formed from a plurality of vertically oriented laminations, and wherein said plurality of bridge members are formed from a plurality of horizontally oriented laminations, wherein a flux path is formed between adjacent base portions through a respective bridge member.

5. The stator assembly in accordance with claim 1, wherein each base portion comprises a pair of end shoulders, and wherein each bridge member engages adjacent end shoulders of circumferentially adjacent base portions.

6. The stator assembly in accordance with claim 1, wherein each tooth assembly is formed from a plurality of stacked laminations, wherein each lamination comprises a tooth portion integrally formed with a base portion as a single piece.

7. The stator assembly in accordance with claim 6, wherein each tooth assembly further comprises a tooth tip positioned at an end of the tooth portion opposite said base portion, wherein each lamination comprises a tooth tip integrally formed with the tooth portion and the base portion as a single piece.

8. An axial flux electric motor comprising:
   a frame comprising a bearing locator;
   a pair of bearing assemblies positioned within said bearing locator;
   a bearing spacer positioned within said bearing locator between said pair of bearing assemblies;
   a rotor assembly; and
   a stator assembly coupled to said frame and positioned proximate said rotor assembly to define an axial gap therebetween, wherein said stator assembly comprises:
   a plurality of circumferentially-spaced tooth assemblies, wherein each tooth assembly comprises a tooth portion and a base portion; and
   a plurality of circumferentially-spaced bridge members, wherein each bridge member is configured to engage a pair of circumferentially adjacent base portions.

9. The axial flux electric motor in accordance with claim 8, further comprising the frame and a plurality of fasteners, wherein each bridge member includes an opening defined therethrough configured to receive a corresponding fastener of said plurality of fasteners, wherein said plurality of fasteners extend between said bridge members and said frame to apply an axial pre-load force to said base portions.

10. The axial flux electric motor in accordance with claim 8, further comprising a bearing spring positioned within said bearing locator between said pair of bearing assemblies, wherein said bearing spacer is positioned between said bearing spring and a bearing assembly of the pair of bearing assemblies.

11. The axial flux electric motor in accordance with claim 8, wherein each base portion comprises a pair of end shoulders, and wherein each bridge member engages adjacent end shoulders of circumferentially adjacent base portions.

12. The axial flux electric motor in accordance with claim 8, wherein said plurality of tooth assemblies and said plurality of base portions are each formed from a plurality of vertically oriented laminations, and wherein said plurality of bridge members are formed from a plurality of horizontally oriented laminations, wherein a flux path is formed between adjacent base portions through a respective bridge member.

13. The axial flux electric motor in accordance with claim 8, wherein each tooth assembly is formed from a plurality of stacked laminations, wherein each lamination comprises a tooth tip positioned at an end of the tooth portion opposite said base portion, wherein each lamination is integrally as a single piece.

14. A method of assembling an axial flux electric motor, said method comprising:
   coupling a plurality of circumferentially-spaced tooth assemblies to a frame, wherein each tooth assembly includes a base portion coupled to the frame and a tooth portion extending axially from the base portion;
   coupling a bridge member to a pair of circumferentially adjacent base portions such that the bridge member extends between the circumferentially adjacent base portions; and
   coupling a first portion of a bobbin to a second portion of a bobbin such that the first and second bobbin portions surround the tooth portion, wherein the first and second bobbin portions are positioned between the base portion and a tooth tip of the tooth portion.

15. The method of claim 14, further comprising:
   inserting a fastener through an opening defined in the bridge member; and
   coupling the fastener to the frame to apply an axial pre-load force to the base portions.

16. The method of claim 14, wherein coupling the bridge member comprises coupling the bridge member to an end shoulder of each of the circumferentially adjacent base portions such that the bridge member is spaced from the frame by the circumferentially adjacent base portions.

17. The method of claim 14, further comprising coupling a bearing spacer and a bearing spring between a pair of bearing assemblies within a bearing locator of the frame.

* * * * *